United States Patent [19]
Remec et al.

[11] Patent Number: 5,214,350
[45] Date of Patent: May 25, 1993

[54] IDENTIFICATION OF IMAGE DISPLAYS AND THEIR COMPONENT PARTS

[75] Inventors: Thomas M. Remec, Des Plaines; Ralph E. Clarke, Jr., River Forest, both of Ill.

[73] Assignee: Zenith Electronics, Glenview, Ill.

[21] Appl. No.: 757,882

[22] Filed: Sep. 11, 1991

[51] Int. Cl.$^5$ .............................. H01J 31/00
[52] U.S. Cl. ...................... 313/477 R; 313/408; 313/513
[58] Field of Search ............... 313/477 R, 513, 514, 313/408; 220/2.1 A, 2.1 R, 2.3 A; 427/53.1; 445/3, 4, 30; 428/187; 40/626, 661

[56] References Cited

U.S. PATENT DOCUMENTS

| | | | |
|---|---|---|---|
| 4,283,655 | 8/1981 | Mossman et al. | 313/462 |
| 4,336,492 | 6/1982 | Torre et al. | 324/404 |
| 4,374,451 | 2/1983 | Miller | 445/30 |
| 4,515,867 | 5/1985 | Bleacher et al. | 427/53.1 |
| 4,737,681 | 4/1988 | Dietch et al. | 313/402 |
| 4,891,545 | 1/1990 | Capek et al. | 313/407 |
| 4,891,546 | 1/1990 | Dougherty et al. | 445/30 |
| 5,019,004 | 5/1991 | Steiner et al. | 445/30 |

OTHER PUBLICATIONS

"IBM" Technical Disclosure Bulletin, Nov. 1971, vol. No. 6, pp. 1703-1704.

Primary Examiner—Donald J. Yusko
Assistant Examiner—Michael Horabik

[57] ABSTRACT

An image display such as a cathode ray tube or flat panel display has an envelope with an external surface and an interior or otherwise non-external surface. Encapsulated indicia may be located on an external surface, or in the preferred embodiment, on an internal surface readable from the external surface. The indicia, being encapsulated on the interior surface, are safe from degradation, thus allowing for easy formation of the indicia by simple printing means which utilize fluid inks.

6 Claims, 3 Drawing Sheets

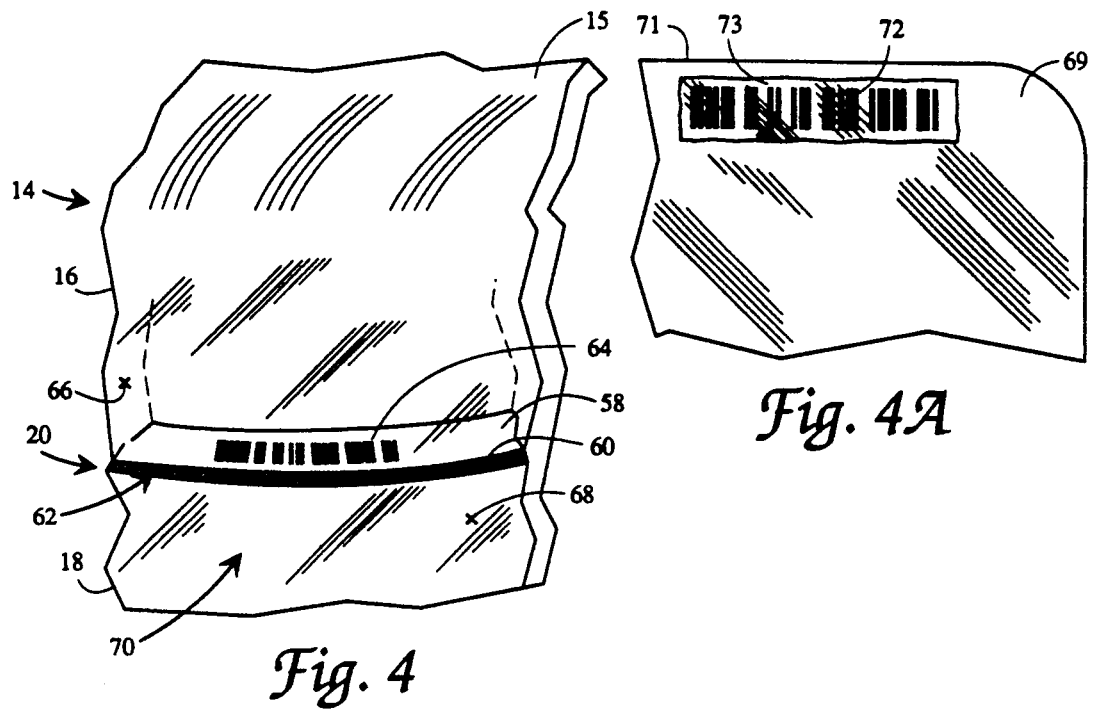
Fig. 4
Fig. 4A
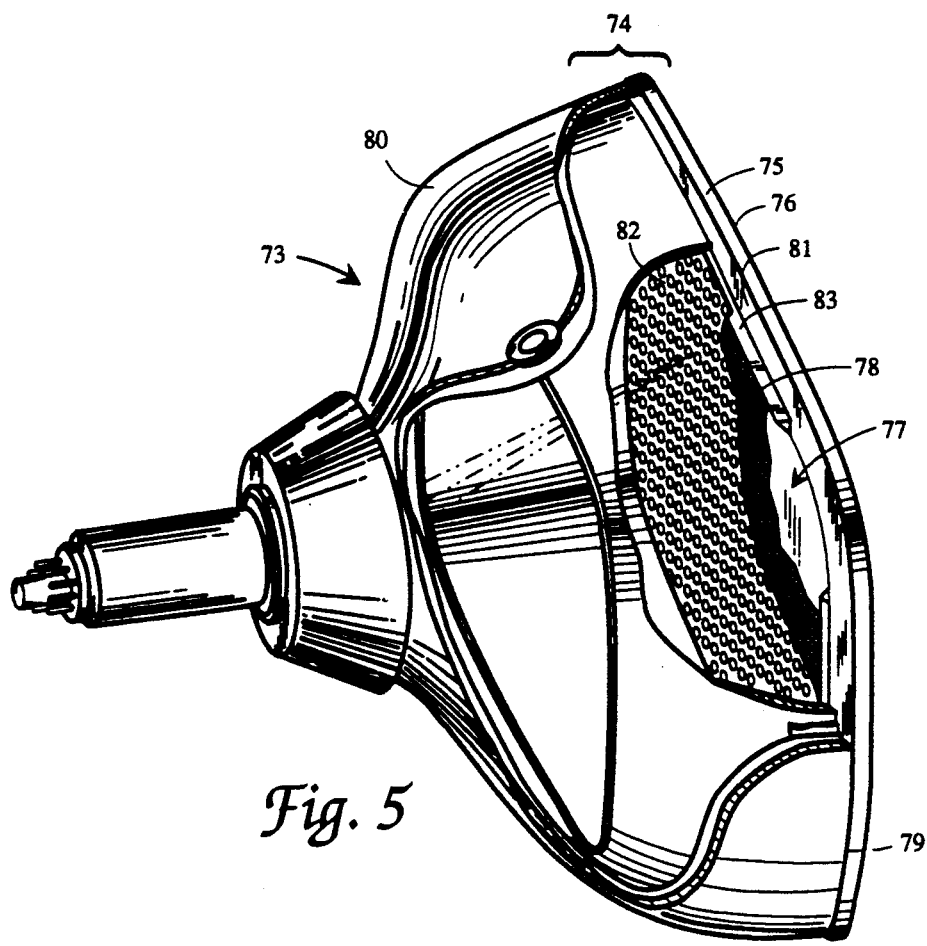
Fig. 5

IDENTIFICATION OF IMAGE DISPLAYS AND THEIR COMPONENT PARTS

CROSS REFERENCE TO RELATED APPLICATIONS

This application, is related to but in no way dependent upon U.S. Pat. No. 5,162,694 of common ownership herewith.

BACKGROUND OF THE INVENTION

1. Field of the Invention

This invention relates to image displays such as cathode ray tubes and flat panel displays, and is addressed specifically to improved means for identifying tubes and displays and their component parts. The invention is useful in the manufacture of monochrome image displays, and color displays including those used in home entertainment television and high-definition television, and in medium-resolution and high-resolution tubes used in color monitors.

It is a requisite in the manufacturing process to be able to positively identify not only the image display itself, but also to identify and distinguish its major components during manufacture. Such identification and distinguishing is particularly important with regard to a faceplate and the associated shadow mask of a color cathode ray tube in that it is presently required that a shadow mask be "married" to a particular faceplate, and follow that faceplate through the several stages of the manufacturing process. For example, during the screening process, the faceplate is separated from the mask four times, and the faceplate and mask must be rejoined after each separation. If by accident, the faceplate is mated with another mask, the resulting tube will be inoperable. The faulty tube will then have to salvaged, a costly operation requiring disassembly of the envelope into its components.

2. Discussion of the Related Art

In U.S Pat. No. 4,374,451 to Miller, there is disclosed a method of assembling a cathode ray tube that includes a coded marking on an external surface of a part such as the faceplate. The coded marking, shown as a bar code, is machine-read, and a manufacturing process is initiated in response. To provide for permanency and resistance to the hostile manufacturing environment, the coded marks are made by erosion of the surface of the part by abrasion, or by ablation by means of a laser beam. To enhance optical contrast, a thin, light-reflective coating, or a thin black, or dark-colored undercoating may be used.

A method for ablating a coded marking into a cathode ray tube part is disclosed in U.S. Pat. No. 4,515,867 to Bleacher et al. A dark-colored undercoating topped by a light-colored coating is applied to a glass workpiece. The coatings comprise pigment particles in an alkali silicate binder. The coded marks are recessed through the coatings by ablation, as with a laser beam.

Any disturbance of the surface of a glass workpiece, whether it be by abrasion or ablation, can be the origin of surface defects which ca lead to cracking of the glass. This is true of the glass components of a cathode ray tube, which are subject to stress-inducing temperatures as high as 460 degrees C. during the manufacturing process. It is especially true of the flat tension mask (FTM) cathode ray tube faceplates which have no curvature to inherently resist vacuum-induced stresses during the heat and exhaust cycle.

In U.S. Pat. No. 5,019,004 to Steiner et al, of common ownership herewith, coded markings are applied to a glass workpiece such as a cathode ray tube faceplate by a dispenser that exudes solder glass paste (frit) to form the lines of a bar code. The coded marks are permanent and are unaffected by high temperatures, or by acidic or caustic washes used in cathode ray tube manufacture.

None of the above references however utilizes the transparent pieces available in display units to affix the indicia to an internal surface of the transparent pieces, encapsulate the indicia for permanence, and then read through the transparent piece.

Coded markings such as bar codes can also be applied to external surfaces of image displays by means of adhesive stickers, paints, inks, or decals. However, markings by such media are by nature impermanent, and vulnerable to high processing temperatures, acidic or caustic washes, and are subject to removal or dislodgment through handling or in passing through the machinery of a production line.

In the context of the present disclosure, an image display can be a monochrome or color cathode ray tube, or a flat panel display. An "indicium" (plural, indicia) is defined as information-bearing marks such as letters, numerals, or a bar code--marks that are permanent rather than transient as in the case of a television picture or the display of a symbol on a computer monitor. Indicia may convey information such as the year of manufacture of the component, the name of the manufacturer, dimensions and composition, the production run, lot number, serial number, and U.S. patent number.

OBJECTS OF THE INVENTION

It is a general object of the invention to provide an apparatus and a method to facilitate the manufacture of image displays such as cathode ray tubes and flat panel displays.

It is an object of the invention to provide for savings in labor and cost in the manufacture of image displays.

It is more specific object of the invention to provide means of identification that are permanent, readable either by human eye and by machine, or both, and simple and quick in application.

It is another specific object of the invention to provide for the positive identification and distinguishment of the faceplates of in-process tension mask color cathode ray tubes.

BRIEF DESCRIPTION OF THE DRAWINGS

The features of the present invention which are believed to be novel are set forth with particularity in the appended claims. The invention, together with further objects and advantages thereof, may best be understood by reference to the following description taken in conjunction with the accompanying drawings (not to scale), in the several figures of which like reference numerals identify like elements, and in which:

FIG. 4 is a detail view in perspective of the interface of the funnel and the faceplate skirt of FIG. 3, and depicting an indicium readable from the wall of a cathode ray tube envelope.

FIG. 4A is a plan view of a section of the faceplate of an image display having an indicium according to the invention on an external surface.

FIG. 5 is a side view in elevation, and cutaway and in perspective, of a tension mask color cathode ray tube.

DESCRIPTION OF THE PREFERRED EMBODIMENT

Figure 1:
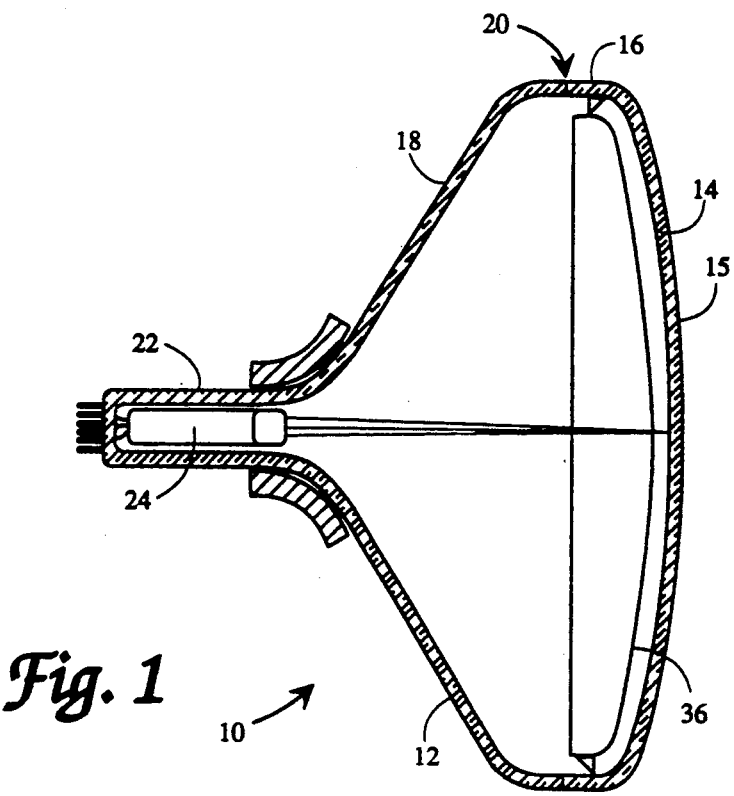
FIG. 1. is side view in elevation and cutaway of a conventional cathode ray tube having a curved shadow mask and a correlatively curved faceplate.

FIG. 1 is a schematic depiction of an image display comprising by way of example a color cathode ray tube 10 having a glass envelope 12 that includes a faceplate 14 having an external surface 15 through which the image is viewed. Faceplate 14 also has a skirt 16 cemented to the mouth of a funnel 18 at faceplate skirt-to-funnel interface 20. Funnel 18 terminates in a neck 22 which encloses an electron gun 24 that projects three electron beams which impinge on a three-color phosphor screen deposited on the inner surface of faceplate 14. A shadow mask 36, curved in correlation with the faceplate, acts as a parallax barrier, providing for color selection. The cathode ray tube could as well be one that provides a monochrome image. In such a tube, there would be no shadow mask and only a single beam for activation of a monochrome phosphor.

Positive identification of the tube 10 is provided by indicia applied according to the invention, as will be described.

Figure 2:
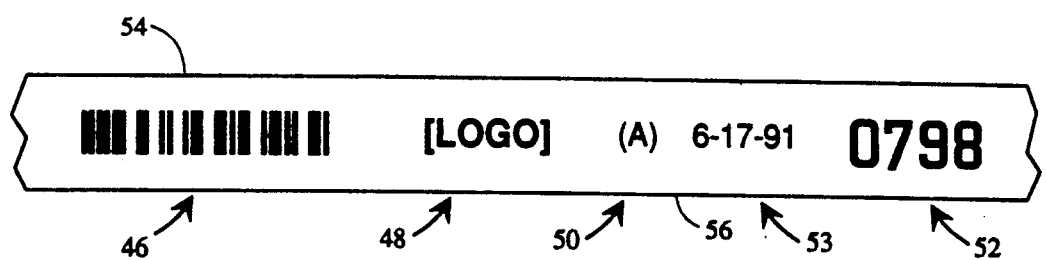
FIG. 2 depicts the forms indicia may take when applied in specific external and non-external locations in image displays.

Indicia may be applied according to the invention either to a non-external surface of an image display such as tube 10, or externally on the envelope 12. FIG. 2 depicts the forms the indicia may take and they may be used singly o in combination. Bar code 46 may be compiled according to code 39, U.P.C., or the USS-1 2/5 code. Also depicted is a company logotype 48, a letter 50 comprising of an "A" enclosed by arbitrary signs comprising parentheses, numbers 52 in a stylized font, and conventional numbers 53, which way of example, may represent the month, day and year of manufacture of a cathode ray tube. Lines 54 and 56 which enclose the indicia 46 define the limits of the surface o which the indicia are deposited, which may be for example, a depositing on a non-external surface in contact with another non-external surface of a cathode ray tube.

Positive identification of the faceplate of a shadow mask color cathode ray tube by the inventive means and method is particularly important. As has been noted, in the color tube production process, the faceplate must be separated from the shadow mask at least four times for separate processing, and the two must be rejoined after each separation.

Figure 3:
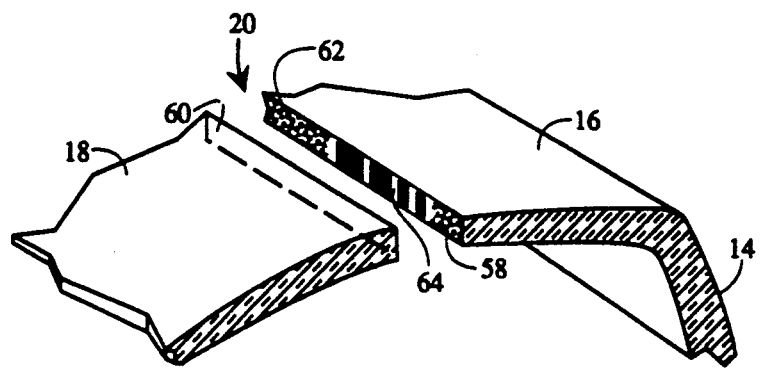
FIG. 3 is a cutaway view in perspective depicting the non-external surfaces of a section of a faceplate and a funnel of a skirted cathode ray tube where indicia may be located.

FIG. 3 depicts in greater detail the interface 20 of the skirt 16 of faceplate 14 and the funnel 18 indicated in FIG. 1; the two are shown as separated for illustrative purposes. The sealing surface 58 of the skirt 16 and the sealing surface 60. of the funnel 18, both being non-external tube surfaces, are permanently joined at interface 20 by means of devitrifying solder glass 62 located at interface 20, as indicated by the dot pattern. The solder glass 62 is first applied as a bead of nondevitrified solder glass paste to the sealing surface 60 of the funnel 18, by way of example.

An indicium 64 in the form of a bar code, by way of example, is formed on the sealing surface 58 of skirt 16, noted as being a non-external surface. The sealing surface 58 of skirt 16 is then pressed into the bead of solder glass paste deposited on sealing surface 60 of funnel 18, and into contact with sealing surface 58 of skirt 16. It is noted that volatile carriers of the fluid base of the the pigment material that forms the indicium will have substantially volatized before this surface contact occurs. The faceplate and the funnel are then exposed to a temperature of about 450 degrees C. by passing them through an oven or lehr. The solder glass devitrifies and crystallizes, and cements sealing surfaces 58 and 60 together. During this process, any products of decomposition of the pigment or its carriers, either escape or remain sealed beneath the devitrified solder glass so as not to contaminate the interior environment of the tube.

FIG. 4 depicts the indicium 64 shown in FIG. 3 indicated as being readable through the transparent portion of the external surface 66 of skirt 16. In this example, indicium 64 is located between the non-external sealing surface 58 of skirt 16, and the non-external sealing surface 60 of funnel 18. The indicium is perceptible by the naked eye and is machine-readable.

The layer of devitrifying solder glass 62 is not transparent so an indicium would not be readable from the external surface 68 of funnel 18; that is, from the direction indicated by arrow 70. Indicium 64 could as well be formed on the sealing surface 60 of funnel 18; however, in this case, because of the opacity of the devitrifying solder glass 62, the indicium would not be readable from the external surface 66 of skirt 16, but only through the external surface 68 of funnel 18, and from the direction indicated by arrow 70.

Solder glass for securing the mask support structure to the faceplate may comprise a product supplied by Corning Glass Works of Corning, N.Y., under the designation 7590 PM. Solder glass CV-695 provided by Owens-Illinois of Toledo, Ohio is an alternate.

Indicia may also be applied to an external surface of an image display, such as the surface 69 of an image display faceplate 71, a section of which is shown by FIG. 4A. A bar code indicium 72 is applied in the form of a pigment material in a fluid base. The fluid base is allowed to substantially volatilize. The remaining pigment material is then overlayed with a durable transparent substance 73 which is undamaged by or substantially impervious to image display manufacturing processes. As a result, indicium 72 can be read subsequent to the application of the durable substance as the pigment material and the covering substance are selected such that they contrast in color subsequent to thermal processing. Indicium 72 is preferably dark in color subsequent to thermal processing, and the transparent substance 73 which overlays it is preferably light in color, thus providing adequate contrast for easy readability.

A colloidal suspension of graphite can be used as the pigment material. Aquadag E (R) available from Acheson Colloids Company of Port Huron, Michigan is a suitable material. Also, manganese carbonate is usable. The characteristics and application of both are described in following paragraphs.

It is to be noted that when an indicium is applied to a non-external surface such as the inner surface of the faceplate, the covering substance need not be transparent, but can rather constitute an opaque substance such as devitrified solder glass.

In addition, the marking material may comprise a pigment such as, for example, particles of pure carbon suspended in an aqueous carrier. The covering substance may consist of a silicate compound such as a ten percent solution of potassium silicate in water painted or sprayed over the indicium 72. The silicate solution in turn substantially volatilizes to a hardness suitable for handling. When the image display is later elevated to the high temperature required for devitrification of the solder glass used to cement components such as a faceplate and funnel together, the silicate compound will harden to permanently protect the underlying indicia.

If specially compounded for transparency, devitrifying solder glass may also be used as the covering substance 73 indicated by FIG. 4A. A coating of such a substance must necessarily be very thin. Clear ceramic glazes may also be used as overlays.

In summary, the substance covering the indicia may, according to the invention, have a color in contrast to that of the indicia, be impervious to thermal processes and harsh chemicals encountered in manufacture, and when the indicia are deposited within the tube envelope, be compatible with the interior environment of the finished image display.

Indicium 72 shown by FIG. 4A, and described as being applied to the external surface of a faceplate, could as well be applied to a non-external surface of the faceplate or other component of the image display envelope.

The benefits of the invention are applicable to the tension mask color cathode ray tube 73 depicted in FIG. 5. The essential differences between tension mask tube 73 and the conventional color tube 10 depicted in FIG. 1 lie primarily in the front assembly 74 of tube 73. Front assembly 74 includes a faceplate 75 which is substantially flat and which has an external surface 76 through which the image is viewed, and an inner surface 77 on which is deposited a phosphor screen 78. The sealing surface 79 of the funnel 8 is cemented to the funnel sealing surface 81 of faceplate 75. A flat tension shadow mask 82 is supported by a mask support structure 83 which extends from, and is secured to the inner surface 77 of faceplate 75 The mask support structure 83 embraces phosphor screen 78.

Figure 6:
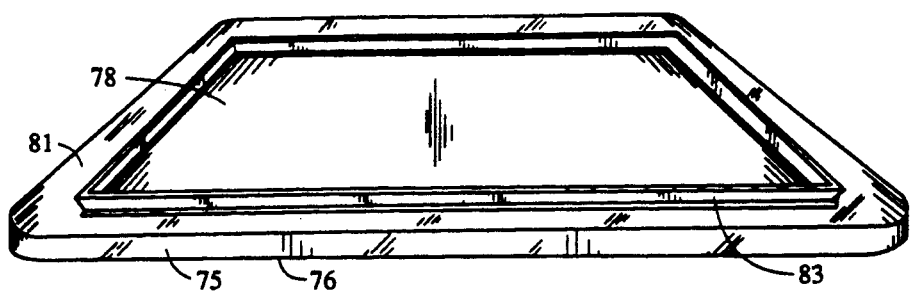
FIG. 6 is a view in perspective of the faceplate assembly depicted in FIG. 5, showing the location and orientation of the shadow mask support structure of FIG. 5 as mounted on the inner surface of the faceplate.

FIG. 6 indicates the orientation and location of the shadow mask support structure 83 in relation to the faceplate 75 and the phosphor screen 78. Mask support structure 83 is indicated as comprising a one-piece unitary structure joined at the corners. Alternatively, the mask support structure may comprise four discrete mask support structures unjoined at the corners, or discrete segments as described and claimed in referent copending application Ser. No. 427,149 filed Oct. 24, 1989. Further, a mask support structure may conform to one of the ceramic mask support structure configurations described and claimed in U.S. Pat. No. 4,891,546, of common ownership herewith. In these configurations (shown by FIGS. 5-9 in the '546 patent), the body of the mask support structure is composed of a ceramic having a base surface for attachment to the inner screening surface 77 by means of devitrifying solder glass. A metal cap cemented to the ceramic body provides a surface to which a flat tension mask is welded.

Figure 7:
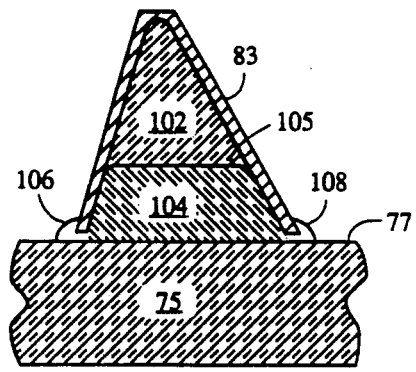
FIG. 7 is a sectional view in elevation that indicates the distribution of solder glass within a hollow metal shadow mask support structure.

FIG. 7 is a cross-sectional view of the mask support structure 83, which is in the form of a hollow shell, or tapered trough of metal filled with two types of solder glass 102 and 104 each of different viscosity, as fully described and claimed in U.S. Pat. No. 4,891,545, of common ownership herewith. The line of demarcation 105 between solder glass 102 and 104 is indicated. Mask support structure 83 is cemented to the inner surface 77 of faceplate 75 by the melting and devitrification of solder glass 104 which overflows to form beads 106 and 108.

Solder glass 104, which secures mask support structure 83 to the glass of the inner surface 77 of faceplate 75, is applied to the base of mask support structure 83 in the form of a paste by means of a solder glass paste-dispensing machine, as described in the referent '545 patent. When the faceplate is raised to a temperature of about 450 degrees C., the solder glass paste melts, and while at 450 degrees C., devitrifies or solidifies, securing mask support structure 83 to the glass of the faceplate 75. In its devitrified form, the solder glass is in a crystalline state which is irreversible, and it will remain a solid adhesive during ensuing high-temperature production operations.

The "footprint" of the solder glass 104 in securing the mask support structure 83 to the inner surface 77 of faceplate 75 indicated by FIG. 7 is about five-sixteenths of an inch, and represents a limitation on the heighth of the indicia. This dimension may vary slightly along the length of the mask support structure 83 as the spread of the solder glass itself varies as it forms beads 106 and 108.

Figure 8:
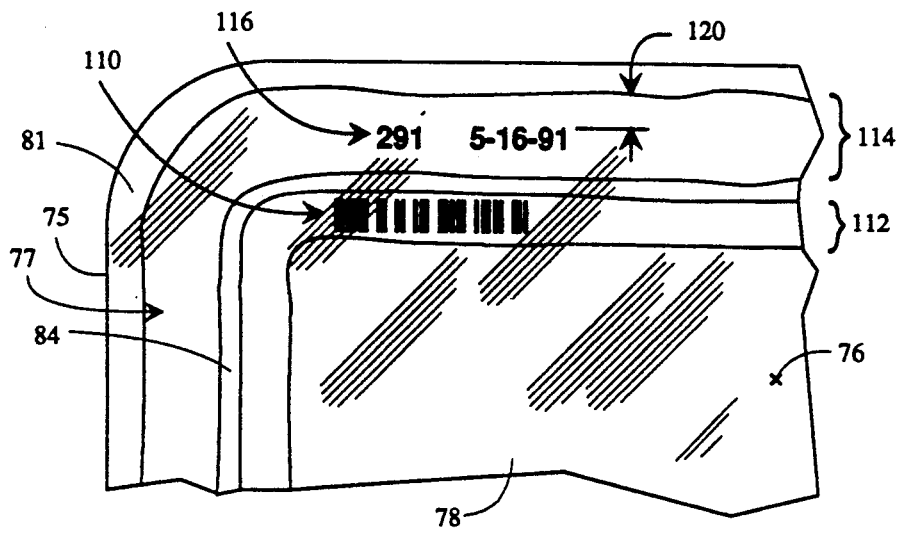
FIG. 8 is a plan view of a corner section of the faceplate of FIG. 5 showing the readability of indicia from the external, viewing surface of the faceplate.

As seen in FIG. 8, the inner surface 77 of faceplate 75 has an indicium 110 in the form of a bar code deposited thereon beneath mask support structure 83 that is readable through the external surface 76 of faceplate 75. Band 112 is the footprint of mask support structure 83, and its irregular boundary indicates the random flow of the solder glass 104 as it melts in its attachment to the glass of the inner surface 77.

The space on the inner surface 77 of faceplate 75 beneath band 112 represents a dedicated area on the faceplate 75; i.e., an area specifically allotted for receiving mask support structure 83. It is in this dedicated area that the indicia are deposited prior to the securing of the mask support structure 83 to the inner surface 77 of faceplate 75. Thus the indicium 110 in band 112 is located between a first non-external surface and a second non-external surface of the tube envelope according to the invention. It is normal practice in the manufacture of tension mask tubes to install the mask support structure before depositing the phosphor screen 78 as the structure aids in the phosphor deposition process.

It will be noted that the indicia are actually deposited between the solder glass and the inside surface of the faceplate, and, in this example, are directly formed on the inner surface 77 of faceplate 75 before installation of the mask support structure and deposition of the phosphor screen 78.

Figure 7A:
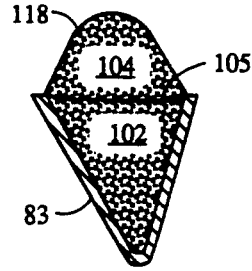
FIG. 7A is a view of the structure shown in FIG. 7 as it appears during a manufacturing process.

Alternatively, and according to the invention, an indicium may be formed on the solder glass paste which cements the mask support structure to the faceplate before the structure is cemented on the faceplate. FIG. 7A depicts the appearance of the mask support structure 83 shown by FIG. 7 during manufacture. Solder glass 104 is layered or otherwise deposited in undevitrified paste form in the tapered trough formed by structure 83, after which it is dried to a hardness sufficient to support the weight of a faceplate, all as described in the referent '545 patent. It will be noted that the dried solder glass paste is in the form of a mound 118 that extends from the body of support structure 83.

Figure 7B:
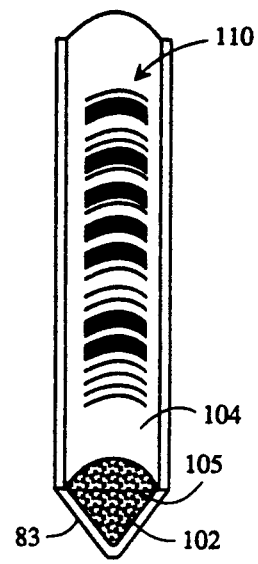
FIG. 7B is plan view of the base of the mask support structure of FIG. 7, showing the application of an indicium to dried solder glass paste.

With reference to FIG. 7B, the bar code indicium 110 previously described is shown as having been deposited directly on the solder glass 104 when it is in paste form. This deposition can be accomplished by means of a rubber stamp, by way of example, using a rolling motion of the stamp. Upon installation of mask support structure 83 on the inner surface 77 of faceplate 75, the solder glass paste shrinks as it melts and devitrifies, becoming perfectly flat in its attachment to the inner surface 77 the faceplate 75, a state indicated by FIG. 7. Indicium 110 is readable from the external surface 76 of the faceplate 75, a condition indicated in FIG. 8.

A similar mounding of solder glass paste occurs when it is deposited on the base of a ceramic tensed foil shadow mask support structure prior to cementing the structure to a faceplate. A ceramic support structure is depicted and described in commonly owned U.S. Pat. No. 4,737,681. Indicia such as indicium 110 can be formed on the mound of solder glass paste layered on the base of such as ceramic mask support structure after the paste has been dried. The ceramic mask support structure is positioned on a dedicated area of the inner surface of the faceplate The mask support structure is then cemented to the inner surface by devitrifying the solder glass. As a result, indicia formed on the solder glass paste are made permanent and are readable either by eye or by machine from the external surface of the faceplate when the solder glass paste is devitrified.

Indicia may as well be located between the faceplate-to-funnel seal, which consists of a first non-external surface and a second non-external surface. The wider band indicated by the bracket in FIG. 8 is the footprint 114 of the sealing surface 79 of funnel 80 which is secured by devitrifying solder glass to the sealing surface 81 of faceplate 75. Indicia 116 deposited in the footprint 114 of funnel 80 are indicated as being readable from the external surface 76 of faceplate 75. The indicia 116 in footprint 114 are also located between a non-external surface in contact with another non-external surface according to the invention. In this example, the numerals "291" (0.291 inch) of indicia 116 define the Q-height of the mask support structure to be used in a particular production run. The numerals "5/16/91" indicate the production date.

With regard to the importance of positive identification of the faceplate in tension foil mask tubes, a faceplate of 14-inch diagonal measure may, for example, be adapted to accommodate mask support structures of several different Q-heights, depending upon the tube application. (Q-height is defined as the distance between the foil shadow mask and the inner surface of the faceplate.) As a result, each faceplate must be incontrovertibly identified so that it can be matched to the mask support structure of proper Q-height.

It is preferred that the pigment material from which the indicia are formed have these characteristics:

(1) Readability. The readability of the indicia must be unaffected by the heat incidental to manufacture, which, as noted, can range as high as 450 degrees C. The lines must remain distinct to be readable from the external surface of the the envelope of the image display. However, changes in appearance of the indicia, such as blackening due to thermal processing, are perfectly acceptable as long as legibility is preserved.

(2) Immunity to solder glass. When the indicia are applied to a non-external surface as depicted in FIGS. 3 and 8, the pigment material is overlaid with solder glass paste. The material must not smear or otherwise become illegible as the solder glass melts and devitrifies.

(3) Adequate Contrast. The material must provide adequate contrast with the surface on which it is formed. A black material is generally preferred.

(4) Electrical Non-Conductivity. In certain applications, such as in the case of the bar code indicium 64 applied at the interface 20 between the funnel and faceplate skirt depicted in FIG. 3, it is imperative that the material of the indicium be electrically non-conductive. The integrity of the hermetic faceplate-to-funnel seal at the interface 20 is tested by exposing it to an electrical potential in the range of of 40,000 to 50,000 volts, as described in U.S. Pat. No. 4,336,492 of common ownership herewith. Even a slight electrical conductivity of the material from which the indicia is formed can degrade the integrity of the hermetic seal. The electrical non-conductivity requirement rules out the use of a carbonaceous pigment or other electrically conductive material in such locations.

(5) Permanence. The indicia must be undamaged by image display manufacturing processes, and remain readable as long as the image display is in use.

(6) Ease of Application. The material from which the indicia are formed must lend itself to quick and easy application, and the fluid base in which a pigment is suspended must be volatilize quickly. A simple rubber stamp can be used to print indicia. Also, indicia can be applied by means of a stencil and by silk-screening. Printing of indicia by an ink-jet printer is also practical, as described in following paragraphs.

As has been noted, a suitable lettering material is Aquadag E (R), preferably in solution at two to six percent solids. The material can be readily applied with a rubber stamp.

Another material suitable for indicia-forming is manganese carbonate, $MnCO_3$. It is light brown in color until heated to the high temperature experienced in tube processing. It then converts to manganese oxide, $Mn_2O_3$, and becomes very dark or even black (depending on the atmosphere in the tube). Also, in its manganese dioxide form, it is electrically non-conductive, which makes it preferable for use in forming indicia at the interface 20 of tube 10 depicted in FIG. 3. A suitable solution comprises five to twenty percent of $MnCO_3$, one percent of a binder such as PVA (polyvinyl alcohol), and a wetting agent such as Triton X-100 supplied by Rohm and Haas Company, Philadelphia, Pa. In this composition, it can be applied either with a rubber stamp or by means of an ink jet printer.

Experiments have shown that a dye can be used to form indicia. A suitable dye is Pylam Jet Black W-53 supplied by Pylam Products Company, Inc., Garden City, N.Y. When protected or otherwise sealed by an overlay of solder glass or potassium silicate, or when deposited between two non-external surfaces of the image display envelope, a Pylam dye may undergo color changes, yet will remain readable even after subjection to high processing temperatures.

Application of indicia by means of an ink-jet printer offers the advantages of very high speed application, a high degree of legibility, and ease in altering the wording of the indicia. A relatively inexpensive "drop-on-demand" ink-jet printer can be used for application of both Aquadag E (R) and manganese carbonate, provided that its use is frequent enough to obviate drying of the printing medium between applications. A suitable printer of this type is the H-P "Think-Jet," Model 2225B, supplied by Hewlett-Packard of Palo Alto, Calif.

A dye lends itself especially well to application by ink-jet printing since it will is not so likely to form insoluble deposits in the printing head. The Domino Amjet printer supplied by Domino Amjet, Inc. of Gurnee, Ill. uses a dye for forming bar codes.

Indicia can be formed from phosphor particles in a suitable suspension. Phosphors can be of the type that are excited by infrared or ultraviolet radiation. The terms "pigment material" and "marking material" as used herein will be understood to include phosphor particle inks such as those which are largely invisible to the naked eye under normal light.

With regard to an application in which an indicia is overlaid by a component such as the tensed foil shadow mask support structure depicted in FIG. 8, it is essential that the material from which the indicia is formed does not extend beyond the limits of the band of solder glass and bleed onto the adjacent glass of the inside surface of the faceplate. If this happens to a dye-formed indicium, the dye will evaporate completely and the indicia will be unreadable. If the indicia is formed from pigments, loose colloidal particles will carbonize or oxidize, resulting in smearing of the indicia. Also, loose particles and oxidates that escape can contaminate or otherwise poison the tube; further, migrant particles can become electrically charged, and in random movement within the envelope, cause electrical shorting.

Furthermore, it is essential that the lettering be as thin and consist of as little material as possible, as the addition of overmuch foreign matter between parts cemented with solder glass can impede proper flow of the molten solder glass and weaken the bond.

A necessary margin of safety is about one-thirty-second to one-sixteenth of an inch, a margin indicated by reference number 120 in FIG. 8.

This restriction of the width of an indicium when formed in a seal area applies as well to an indicia applied to an external surface of an image display, as illustrated in FIG. 4A. It is essential that indicium 72 be completely covered by the transparent substance 73 that overlays it, otherwise bleeding of a pigment or evaporation of a dye can occur, leading to illegibility.

The benefits of indicia applied according to the invention include low cost, easy application, permanence and legibility. With regard to legibility, after an indicium such as a bar code is formed on a non-external surface, the indicium can be easily be machine-read through the faceplate glass. The same applies to an indicium deposited on an external surface, i.e., one covered by a transparent substance. Further, and by way of example, when a tension mask cathode ray tube is mounted in a television set cabinet or a computer monitor cabinet, the indicia will not be visible to the viewer as the mask support structure beneath which the indicia lie is concealed by the escutcheon that frames the faceplate.

A further benefit lies in the fact that surface defects are not induced in the glass, as would be the case when indicia are formed by abrasion or ablation.

When the indicia are in situ between non-external surfaces of an intact cathode ray tube, the indicia are literally unerasable. However, it may be necessary to remove the indicia when a tube is salvaged. Salvaging is accomplished by disassembling the major components of the tube envelope; for example, and with regard to the tension mask tube shown by FIGS. 5-8, the faceplate 77 is separated from the funnel 80, and the mask support structure 83 is separated from the inner surface 84 of the faceplate 77. The separation of funnel and faceplate, known as "debeading," is accomplished by immersing the faceplate assembly 22 in a bath containing a solution of nitric acid, which dissolves the devitrified solder glass that bonds the components together. A mask support structure is similarly separated from the faceplate to which it is cemented by dissolving the solder glass cement with nitric acid.

The exposed indicia can be removed by a glass cleaning compound such as one to five percent solution of hydrofluoric acid in water. Sodium hydroxide can also be used in a concentration of two to ten percent and at an application temperature of 65 degrees C.

While a particular embodiment of the invention has been shown and described, it will be readily apparent to those skilled in the art that changes and modifications may be made in the inventive means and method without departing from the invention in its broader aspects, and therefore, the aim of the appended claims is to cover all such changes and modifications as fall within the true spirit and scope of the invention.

We claim:

1. An image display having an envelope with an external surface and at least a first non-external surface, the envelope having permanent indicia located on the first non-external surface readable from the external surface; and
    further defined by having the permanent indicia located in the interface between the first non-external surface and a second non-external surface of the envelope where the first and second non-external surfaces are joined.

2. The image display according to claim 1 wherein the first and second non-external surfaces comprise a funnel-to-faceplate seal and the indicia are electrically non-conductive.

3. The image display according to claim 1 wherein the permanent indicia are machine-readable.

4. For use in a tension mask color cathode ray tube, a faceplate having an external surface and an inner surface with a tension mask support structure secured thereto, the faceplate having indicia thereon beneath the tension mask support structure readable from the external surface.

5. The faceplate according to claim 4, wherein the tension mask support structure is secured to the inner surface by devitrifying solder glass.

6. The faceplate according to claim 4 wherein the indicia are machine-readable.

* * * * *